United States Patent [19]

Ginder, Jr.

[11] Patent Number: 5,375,620

[45] Date of Patent: Dec. 27, 1994

[54] SELF-ADJUSTING FLOW METERING DEVICE

[75] Inventor: William F. Ginder, Jr., Roanoke, Va.

[73] Assignee: Graham-White Mfg. Co., Salem, Va.

[21] Appl. No.: 202,006

[22] Filed: Feb. 25, 1994

[51] Int. Cl.[5] .................................. G05D 11/03
[52] U.S. Cl. ............................................ 137/117
[58] Field of Search ........................... 137/117, 118

[56] References Cited

U.S. PATENT DOCUMENTS

| | | |
|---|---|---|
| 2,216,422 | 6/1937 | Schimanek . |
| 2,917,067 | 12/1959 | Pearl ........................ 137/117 |
| 2,944,627 | 7/1960 | Skarstrom . |
| 3,024,798 | 3/1962 | Banker ..................... 137/117 X |
| 3,128,783 | 4/1964 | Cowles et al. ............ 137/117 |
| 3,282,323 | 11/1966 | Katz et al. ............... 137/117 X |
| 3,589,384 | 6/1971 | Eckert . |
| 4,033,371 | 7/1977 | Keedwell . |
| 4,213,741 | 7/1980 | Rogers et al. . |
| 4,327,763 | 5/1982 | Budzich ................... 137/117 |
| 4,418,710 | 12/1983 | Johnson ................... 137/117 |
| 4,708,156 | 11/1987 | Knudsen .................. 137/117 |
| 4,891,051 | 1/1990 | Frantz . |
| 5,016,482 | 5/1991 | Clingman, Jr. et al. . |

Primary Examiner—Stephen M. Hepperle
Attorney, Agent, or Firm—Jones, Tullar & Cooper

[57] ABSTRACT

A self-adjusting flow metering device is provided for regulating a secondary flow in volumetric proportion to a main flow from which the secondary flow is taken. The device includes a flow sensitive orifice which automatically adjusts its orifice area in relation to the static pressure within the device. A diaphragm is used to regulate the amount of secondary flow passing out from the self-adjusting flow metering device in relation to the pressure differential across the flow sensitive orifice. The device is particularly useful for separating a purge flow from a compressed gas stream, the purge flow being useable for regenerating an idle desiccant chamber in a pressure swing dehydration system having twin desiccant chambers for removing water vapor from the compressed gas stream.

10 Claims, 3 Drawing Sheets

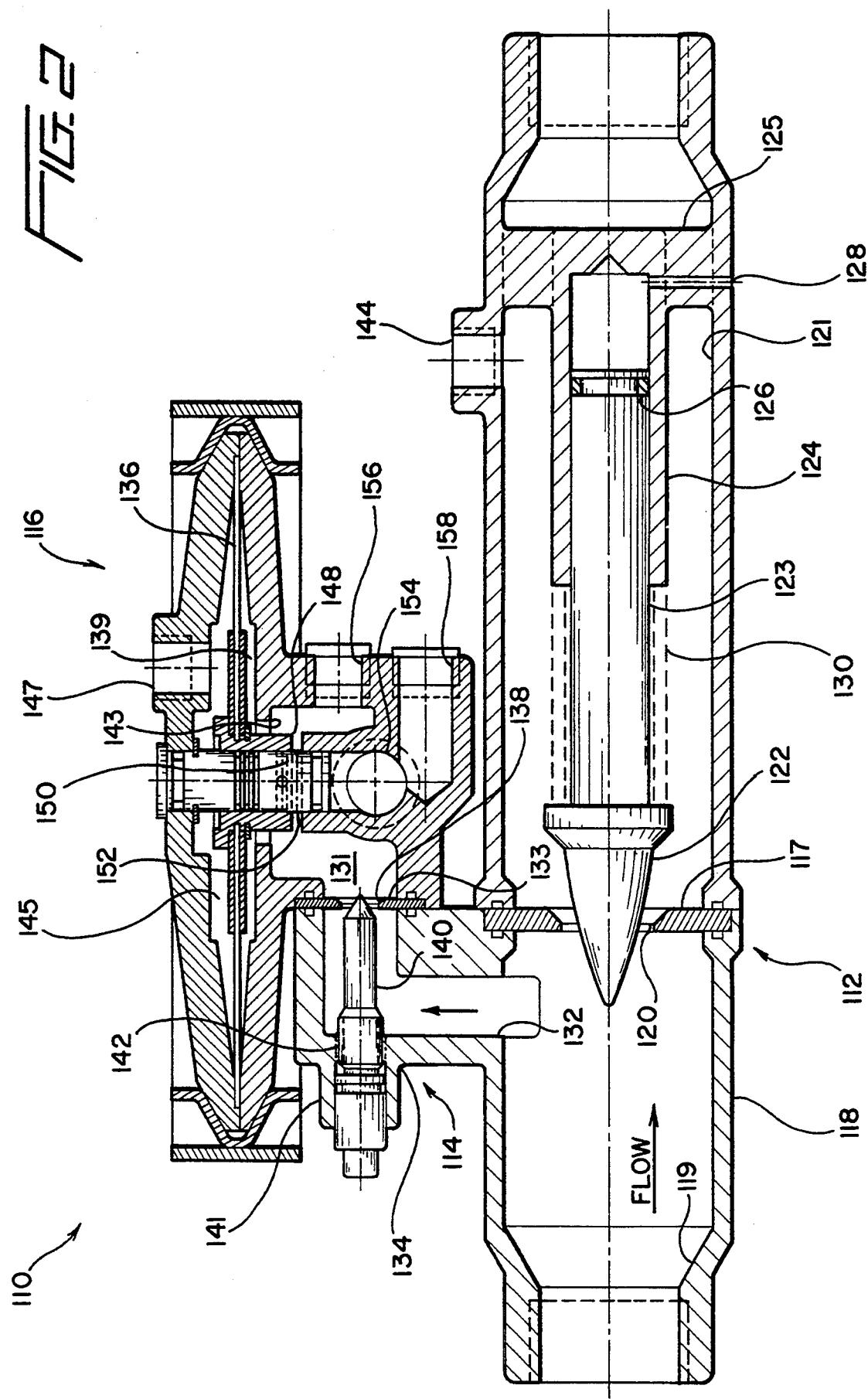

SELF-ADJUSTING FLOW METERING DEVICE

FIELD OF THE INVENTION

The present invention is directed generally to a flow metering device. More particularly, the present invention is directed to a self-adjusting device for dividing and metering a fluid flow into two flow streams. Most specifically, the present invention is directed to a device which automatically apportions a quantity of fluid from a main flow to a purge flow for efficiently regenerating an idle desiccant chamber in a twin chamber desiccant system.

DESCRIPTION OF THE PRIOR ART

In the operation of twin chamber adsorbent systems for decontaminating compressed gas, one of the adsorbent chambers is generally in use while the second adsorbent chamber is undergoing regeneration. Following regeneration of the adsorbent in the second chamber, the flow of the compressed gas may be rerouted to the second chamber, and the first chamber may then be regenerated. It has been found that the most economical way to regenerate the inactive chamber in such a system is to draw off a portion of the compressed gas from the main flow after it has been decontaminated, and to use the drawn-off portion of compressed gas as a regenerating purge flow. This purge flow is directed through the idle chamber in the reverse direction from that of the normal gas flow, thereby regenerating the chamber adsorbent. However, since the drawing off of a purge flow from the main flow decreases the efficiency of the system, it is desirable to draw off no more purge flow from the main flow than is necessary for proper regeneration of the idle chamber.

A specific example of such a system in which the present invention may be used is a pressure swing dehydration system which is used to remove water vapor from a compressed gas stream. The system consists of two chambers filled with solid desiccant beads. Wet compressed gas is directed through one of the chambers where water vapor is adsorbed by the desiccant. While one of the chambers is being used to dry the gas stream, a portion of the dried gas exiting from the system is expanded to a lower pressure and directed through the idle desiccant chamber in the opposite direction from the flow path of the compressed gas flow when it is being dried. This expanded gas purges adsorbed water from the desiccant and carries it out of the system. After a period of time, the wet compressed gas flow and purge flow are switched between the two chambers. By this arrangement, the desiccant in each chamber is alternately adsorbing water vapor and then desorbed of the water it has previously adsorbed.

If the system is to substantially reduce the quantity of water vapor in the compressed gas, several design requirements must be observed. The compressed gas and purge gas must be in contact with the desiccant for a time adequate for adsorption and desorption of the water vapor to occur. The flows must be switched from one chamber to the other frequently enough that the capacity of the desiccant to adsorb water vapor is not exceeded. In addition, the volume of the purge gas used for regeneration of the desiccant must be adequate to carry away the water vapor previously adsorbed.

Since in a pressure swing system adsorption and desorption occur at essentially the same temperature, with neither the adsorption nor the desorption process being totally efficient, the volume of purge gas expanded to a reduced pressure required for complete regeneration of the desiccant will always slightly exceed the volume of higher pressure compressed gas that has been dried. One common prior method of controlling the volume of purge gas is to expand a portion of the main flow through a calibrated orifice or a manually adjusted needle valve. This method provides a volume of purge gas which varies with the pressure of compressed gas being dehydrated. In most applications, both the flow rate and the pressure of the compressed gas being dehydrated will vary according to downstream demand. To assure adequate dehydration of the main flow, the purge flow volume must be set at the lowest pressure and in proportion to the highest compressed gas flow rate for each individual application. When the purge gas volume is controlled using a fixed orifice in this manner, excessive amounts of dehydrated main flow gas are used for regeneration at conditions of higher pressure or reduced usage of the main flow gas. The use of excessive amounts of gas in the purge flow equates to unnecessary expense in the operation of the dehydration equipment.

A pressure regulator can be used upstream of a fixed purge control orifice or needle valve to reduce the excessive use of purge gas due to variations in the main flow pressure, but this will not prevent excessive purge flow during periods of reduced use of the main flow. In addition, it is common in these systems to use the purge gas flow to repressurize the chamber which has just been regenerated prior to switching the compressed gas flow into that chamber. This practice eliminates the possibility of damage to the desiccant beads caused by high velocity surges of gas through the chamber when the flows are switched. The use of a pressure regulator in the system would require that additional valving and controls be included to enable repressurization of the regenerated chamber.

In the past, a number of other methods have been used for apportioning the amount of purge flow withdrawn from the main flow. One such prior system uses electronic solenoid valves and a microprocessor as a controller for an apportioning means. The microprocessor controls the amount of purge flow based on a number of variables such as mass flow rate, pressure, and temperature of the gas being dehydrated. This arrangement is both complex and relatively expensive.

Another prior device which controls the amount of purge flow based upon the volume of the main flow uses movable first and second valve elements mechanically connected to each other to control the purge flow in relation to the main flow. As the main flow increases through the first valve element, the purge flow through the second valve element also increases nonlinearly. Opposing Belleville washers are used to obtain a nonlinear spring rate based upon changing contact points. The stiffness of the Belleville washers increases as the valve elements move in one direction in response to the volume of flow, and the stiffness decreases as they move in the opposite direction. Such a spring arrangement, however, may require special contouring of the Belleville washers, or other additional adjustments and calibrations.

From the foregoing, and from an examination of other art in the area, it will be apparent that a need exists for a flow metering device which economically apportions the purge flow in relation to the main flow, which does not require expensive components, which is easily manufactured, and is simple to install. The flow metering device in accordance with the present invention overcomes the limitations of the prior devices and provides a significant advance in the art.

SUMMARY OF THE INVENTION

It is an object of the present invention to provide a flow metering device.

Another object of the present invention is to provide a flow metering device which delivers a purge flow that is in volumetric proportion to a main flow.

A further object of the present invention is to provide a metering device which provides an adequate, but not excessive purge supply of gas to an idle adsorption chamber.

An additional object of the present invention is to provide a flow metering device that is relatively inexpensive and is also simple to install and operate.

A still further object of the present invention is to provide a flow metering device which may be incorporated into existing systems, as well as being useable in new systems.

As will be discussed in detail in the description of the preferred embodiment which is set forth subsequently, the self-adjusting flow metering device in accordance with the present invention consists of a self-contained device which provides an adequate but not excessive volume of purge gas to be used for regeneration of an idle adsorption chamber. The resent invention controls the volume of purge gas in proportion to the volume of compressed gas being dehydrated. In addition, the present invention may be incorporated into the design of newly manufactured systems or used to replace less efficient purge flow controls in existing systems.

The present invention utilizes a metering tube having a flow sensing orifice or venturi which causes a drop in pressure of the gas flowing through the metering tube. A purge flow port branches off from the metering tube prior to the sensing orifice and feeds to one side of a diaphragm. A control pressure port branches off from the metering tube downstream of the sensing orifice and feeds to the opposite side of the diaphragm. The diaphragm is connected to a variable orifice which increases as the diaphragm moves in response to an increase in the pressure drop across the sensor orifice. As the rate of flow of the dried compressed gas of the main flow increases, the pressure drop also increases. The increase in static pressure causes the size of the variable orifice to increase, and thereby increases the amount of purge flow permitted to flow through the variable orifice. In an alternative embodiment the flow sensing orifice is placed in the purge flow line rather than the main flow line.

The flow metering device in accordance with the present invention overcomes the limitations of the prior art devices and provides a unique and relatively simple device for controlling a secondary flow of fluid so that it will be in volumetric proportion to a main flow stream from which it is to be taken. The flow metering device of the present invention provides a substantial advance in the art.

BRIEF DESCRIPTION OF THE DRAWINGS

While the novel features of the flow metering device in accordance with the present invention are set forth with particularity in the appended claims, a full and complete understanding of the invention may be had by referring to the detailed description of the preferred embodiment which is set forth subsequently, and as illustrated in the accompanying drawings in which:

FIG. 2 is a cross sectional view in accordance with a second embodiment of the present invention;

DESCRIPTION OF THE PREFERRED EMBODIMENT

Figure 1:
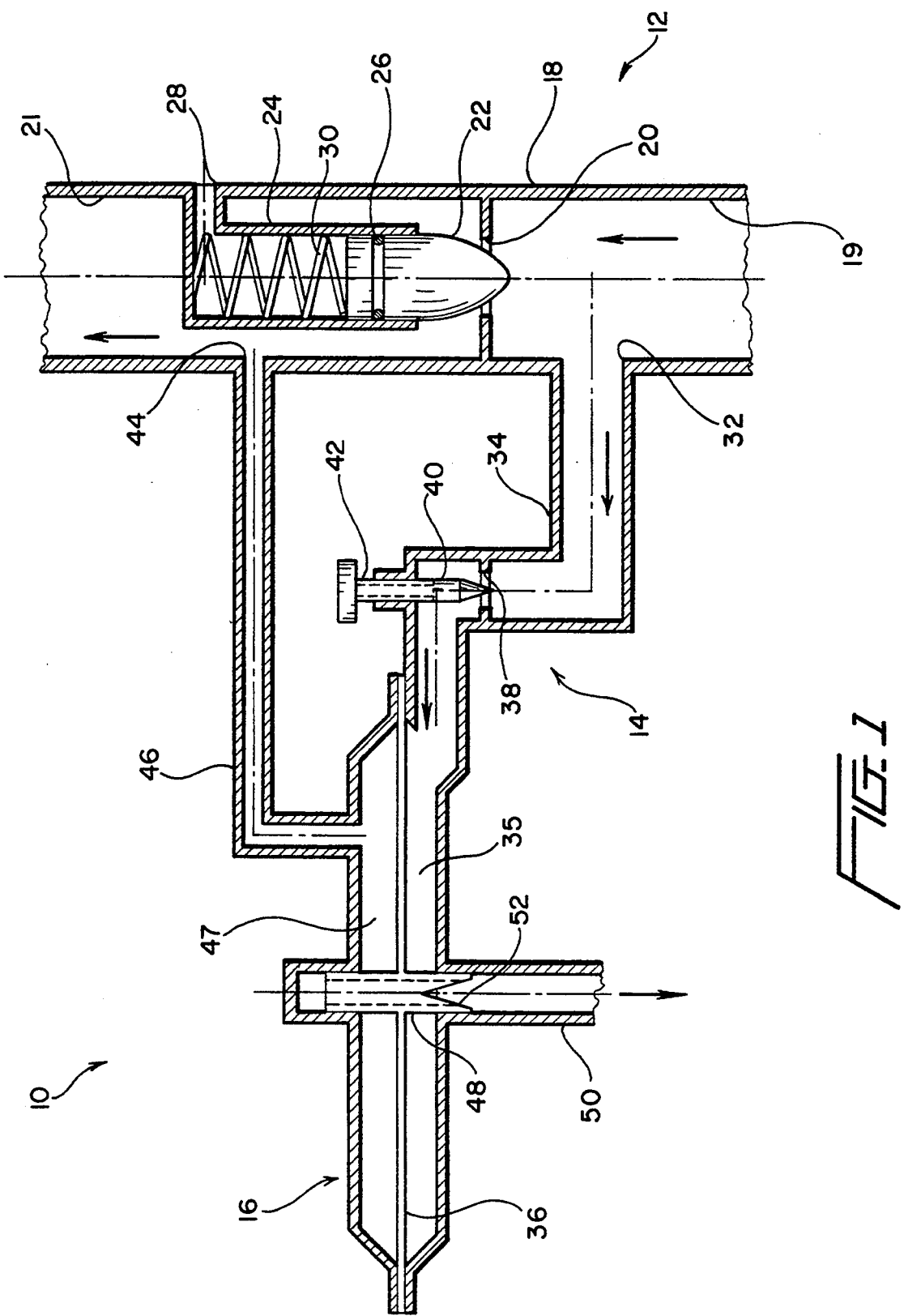
FIG. 1 is a cross sectional view in accordance with a first embodiment of the present invention.

Referring to FIG. 1 there may be seen generally at 10 a first preferred embodiment of a self-adjusting flow metering device in accordance with the present invention. In a brief overview, flow metering device 10 has a main flow section 12, a secondary or purge flow section 14, and a diaphragm chamber 16. Static pressure differential between the upstream area and downstream main flow in main flow section 12 is sensed within diaphragm chamber 16, which, in turn, regulates the amount of purge flow which passes through purge flow section 14. The greater the difference in the upstream and downstream static pressures in main flow section 12, the greater the volume of the purge flow permitted to flow through purge flow section 14.

Main flow section 12 includes a metering tube 18 which includes an upstream portion 19 and a downstream portion 21. Between upstream portion 19 and downstream portion 21, metering tube 18 contains a flow sensing orifice 20. Projecting into flow sensing orifice 20 is a bullet-shaped contoured plug 22. Plug 22 is reciprocally mounted piston-like in a cylinder 24 disposed within metering tube 18. Plug 22 has a seal 26 for preventing fluid in metering tube 18 from leaking into cylinder 24, and cylinder 24 has a vent opening 28 which vents the interior of cylinder 24 to the ambient atmosphere outside of metering device 10. A compression spring 30 within the cylinder bears against the rear of plug 22 creating a force in the direction of flow sensing orifice 20. The cross sectional area of plug 22 and the rate of spring 30 are designed so that the plug will project further into flow sensing orifice 20 at low static pressure within metering tube 18 than it will at high static pressure. Or, in other words, the static pressure differential between the interior of metering tube 18 and the interior of cylinder 24 will force plug 22 further into cylinder 24 and away from flow sensing orifice 20 as the static pressure increases within metering tube 18 as compared with the pressure outside of metering device 10. Plug 22 is contoured to a shape which will reduce the area of flow sensing orifice 20 as plug 22 projects further into it. The extent of the projection of plug 22 into flow sensing orifice 20 in relation to the static pressure within metering tube 18 acts to create a variable restriction in metering tube 18 having an area which varies in relation to the absolute static pressure within metering tube 18.

Upstream of flow sensing orifice 20 in metering tube 18 is a purge flow port 32. A purge flow tube 34 connects purge flow port 32 in fluid communication with diaphragm chamber 16. Diaphragm chamber 16 has a diaphragm 36 located therein, and purge flow tube 34 is in fluid communication with a lower cavity 35 on the lower side of diaphragm 36 within diaphragm chamber 16. Within purge flow tube 34 is a choke orifice 38, with a tapered plug 40 projecting into choke orifice 38. Tapered plug 40 has a screw thread 42 or other mechanism at its base which will allow the area of restriction in choke orifice 38 to be manually adjusted.

Downstream of flow sensing orifice 20 in metering tube 18 is a control pressure port 44. A control pressure tube 46 connects control pressure port 44 to diaphragm chamber 16, feeding to an upper cavity 47 on the side of diaphragm 36 opposite from lower cavity 35 and purge flow tube 34.

In the center of diaphragm 36 is attached a slotted tube 48 which is free to slide up and down within a purge outlet tube 50 which is in fluid communication with lower cavity 35. Slotted tube 48 has a first end connected to diaphragm 36, and a second slotted or otherwise perforated end 52 which extends into purge outlet tube 50. As slotted tube 48 moves up or down, slotted end 52 is uncovered or covered by purge outlet tube 50, increasing or decreasing the area of slotted end 52 which is exposed. When slotted end 52 is exposed, purge flow may pass through slotted end 52 into purge outlet tube 50. The more that slotted end 52 is exposed, the greater the amount of purge flow which may pass into purge outlet tube 50. An imbalance in pressure between lower cavity 35 and upper cavity 47 will cause slotted tube 48 to move up or down until the pressures are balanced.

In operation, metering device 10 will deliver a purge flow to purge outlet tube 50 that is in a constant volumetric proportion to the main flow through metering tube 18, regardless of fluctuations in pressure or flow rate. The restriction in metering tube 18 created by flow sensing orifice 20 and contoured plug 22 causes a drop in pressure of fluid flowing through metering tube 18. Since control pressure port 44 and control pressure tube 46 connect downstream area 21 of metering tube 18 to upper cavity 47 of diaphragm chamber 16 above diaphragm 36, the static pressure above diaphragm 36 is related to the static pressure in downstream area 21. Similarly, the static pressure in lower cavity 35 below diaphragm 36 is related to the pressure in upstream area 19 of metering tube 18. As the rate of flow of fluid through metering tube 18 increases, the pressure drop across flow sensing orifice 20 also increases. This causes an imbalance of pressure between upper cavity 47 and lower cavity 35. Diaphragm 36 rises in response to the pressure differential until the pressures on either side of diaphragm 36 are balanced. The rising of diaphragm 36 also raises slotted tube 48, which uncovers more of slotted end 52. This enables the flow of fluid through purge flow port 32 to increase, thus increasing the amount of purge flow relative to the increase in the main flow. The flow out of purge outlet tube 50 may be directed to an idle adsorbent chamber in need of regeneration by means of external additional valving (not shown). This additional external valving is also used to switch the purge flow from one chamber to the other.

Choke orifice 38 in purge flow tube 34 may be used to cause a drop in the pressure of the fluid flowing through purge flow tube 34. By adjusting tapered plug 40 within choke orifice 38, the amount of purge flow relative to the amount of main flow may be controlled. The further that tapered plug 40 projects into choke orifice 38, the less purge flow will pass relative to the amount of main flow passing through metering tube 18. Thus, choke orifice 38 adjusts the ratio between the main flow and the purge flow, and enables metering device 10 to be calibrated for different system pressure and flow rates. If a fixed ratio is desired then choke orifice 38 and tapered plug 40 may be eliminated.

The relationship between the mass flow rate of a gas and the drop in pressure caused by a restriction in the flow path can be expressed by the following mathematical equation:

$$Q = K*A*(dP*P/T/Sg)^{0.5}$$

Where:
  $Q$ = the mass flow rate
  $K$ = a dimensionless constant
  $A$ = the area of the restriction
  $dP$ = the drop in pressure
  $P$ = the absolute pressure of the gas upstream of the restriction
  $T$ = the absolute temperature of the gas
  $Sg$ = the specific gravity of the gas In metering device 10, the pressure upstream of flow sensing orifice 20 (P), the temperature (T), and the specific gravity (Sg) are the same for gas flowing through metering tube 18 and purge flow tube 34. As previously described, metering device 10, by means of diaphragm 36, controls the flow through purge flow tube 34 in a manner that maintains the drop in pressure across flow sensing orifice 20 equal to the drop in pressure across choke orifice 38. If Q1 represents the total mass flow rate into metering device 10, and Q2 represents the mass flow exiting the device through purge outlet tube 50, then the flow through flow sensing orifice 20 equals Q1–Q2. If A1 represents the area of the restriction at flow sensing orifice 20, and A2 represents the area of the restriction at choke orifice 38, then from the equation set forth above, it can be shown that:

$$Q2 = Q/((A1/A2) + 1)$$

The mass flow rate from purge flow outlet tube 50 will be proportional to the mass flow rate into metering device 10 at any normal gas pressure or temperature. The ratio of the mass flow from purge outlet tube 50 to mass flow into metering device 10 is determined solely by the ratio of the area of the restriction at flow sensing orifice 20 to the area of the restriction at choke orifice 38. The effect this result is the ability of metering device 10 to control the purge flow from purge outlet tube 50 at a constant volumetric ratio to the gas flow into the device. The ratio of the areas of the restrictions must be caused to vary in relation to the pressure of the gas entering metering device 10. Contoured plug 22 accomplishes this function by increasing the area of the restriction at flow sensing orifice 20 as the static pressure increases.

The relationship between the volumetric and mass flow rate of a gas can be expressed by the following mathematical equation:

$$V = C*Q*T/P$$

Where:
  $V$ = the volumetric flow rate
  $Q$ = the mass flow rate
  $C$ = a dimensionless constant
  $T$ = the absolute temperature of the gas
  $P$ = the absolute pressure of the gas In the manner in which metering device 10 is used in a pressure swing dehydration system, the purge gas exiting from purge outlet tube 50 is used as a purge gas at a constant pressure P2, normally atmospheric pressure, which is lower than the variable pressure P1 of the gas which is entering metering device 10. The volumetric flow of purge gas (V2) exiting purge outlet tube 50 is normally greater than the volumetric flow (V1) of gas being dehydrated. The ratio of the volumetric flows can be expressed as R=V2/V1. The temperature of both flow streams will be approximately the same. From the previous equations it can be shown that the relationship of the mass flow rates can be expressed as:

$$Q2 = Q1 * R * P2/P1$$

Therefore:

$$A1 = A2 * ((P1/P2/R) - 1)$$

In metering device 10 the area A2 is formed by choke orifice 38 and tapered plug 40. Tapered plug 40 is used to manually adjust the ratio R of the flows. If it is not included in metering device 10, the ratio will be fixed. In the following equations area A4 is the minimum area of the flow path through choke orifice 38 without tapered plug 40. If tapered plug 40 is included in metering device 10, the ratio R is the maximum for which the device is designed.

Area A1 is formed by flow sensing orifice 20 and contoured plug 22. Area A1 varies with the extent of projection of contoured plug 22 into flow sensing orifice 20. Area A1 is the minimum area of the flow path of the gas between flow sensing orifice 20 and contoured plug 22. The minimum area of the flow path through flow sensing orifice 20 alone is represented by A3. The extent of projection of contoured plug 22 into flow sensing orifice 20 can be expressed as follows:

$$L = A5/S * (P3 - P1)$$

Where:
L = the distance contoured plug 22 extends into flow sensing orifice 20
A5 = the area of cylinder 24
S = the spring rate of compression spring 30
P3 = the maximum absolute pressure for which metering device 10 is designed (at P3 L=0 and A1=A3)

From the preceding equations, area A3 of flow sensing orifice 20 and the minimum area A1 between flow sensing orifice 20 and contoured plug 22 can be expressed as follows:

$$A3 = A4 * ((P3/P2/R) - 1)$$

$$A1 = A3 - L * (A4/A5) * S/R/P2$$

A second preferred embodiment the present invention is illustrated in FIG. 2. Self-adjusting flow metering device 110 has a main flow section 112, a secondary or purge flow section 114, and a diaphragm chamber 116. Static pressure differential between the upstream and downstream main flow in main flow section 112 is sensed within diaphragm chamber 116, which regulates the amount of purge flow which passes through purge flow section 114. The greater the difference in the upstream and downstream static pressures, the greater the volume of the purge flow.

Main flow section 112 includes a metering tube 118 which includes an upstream portion 119 and a downstream portion 121. Between upstream portion 119 and downstream portion 121, metering tube 118 contains an orifice plate 117, with a flow sensing orifice 120 located in its center. Projecting into flow sensing orifice 120 is a conical contoured plug 122 having an elongate cylindrical plug body 123. Plug body 123 is reciprocally mounted piston-like in a cylinder 124 disposed within metering tube 118, coaxial with metering tube 118 and flow sensing orifice 120. Cylinder 124 is supported by a crosshair type support 125 which allows flow around the support members. Plug 122 has a seal 126 for preventing fluid in metering tube 118 from leaking into cylinder 124. Cylinder 124 has an opening or vent 128 which is vented to the ambient atmosphere external to metering device 110. A compression spring 130 is mounted upon plug body 123, and bears against the rear of plug 122 creating a force in the direction of flow sensing orifice 120. The cross sectional area of plug body 123 and the rate of spring 130 are designed so that the plug will project further into flow sensing orifice 120 at low static pressure within metering tube 118 than it will at high static pressure. Plug 122 is contoured to a shape which will reduce the area of flow sensing orifice 120 as plug 122 projects further into it. The extent of the projection of plug 122 into flow sensing orifice 120 in relation to the static pressure within metering tube 118 acts to create a variable restriction in metering tube 118, having an area which varies in relation to the differential between the static pressure within metering tube 118 and the ambient static pressure to which cylinder 124 is vented.

In upstream portion 119 of metering tube 118 there is located a purge flow port 132. A purge flow tube 134 connects purge flow port 132 in fluid communication to a cylindrical purge flow chamber 131. Between purge flow tube 134 and purge flow chamber 131 is a choke orifice plate 133 having a choke orifice 138 in its center. A tapered plug 140 projects into choke orifice 138. Tapered plug 140 is mounted in a tapered plug support 141 attached to the wall of purge flow tube 134, and has a screw thread 142 or other mechanism at its base which will allow the area of restriction in choke orifice 138 to be manually adjusted.

Diaphragm chamber 116 has a diaphragm 136, with a lower cavity 139 below diaphragm 136. Diaphragm chamber 116 is mounted such that lower cavity 139 is in fluid communication with purge flow chamber 131 through opening 143. Diaphragm chamber also has an upper cavity 145 located above diaphragm 136. Upper cavity 145 is in fluid communication with an upper cavity inlet 147.

Downstream of flow sensing orifice 120 in metering tube 118 is a control pressure port 144. A tube, braided hose, or other suitable means (not shown) may be used to connect control pressure port 144 in fluid communication with upper cavity inlet 147, and thereby put downstream area 121 of metering tube 118 in fluid communication with upper cavity 145 of diaphragm chamber 116.

In the center of diaphragm 136 is attached a sleeve 148 which is reciprocally mounted over a perforated tube 150. When sleeve 148 moves up or down, slots or holes 152 in perforated tube 150 are uncovered or covered by sleeve 148, controlling the amount of purge flow which passes through holes 152 into the interior of perforated tube 150. The interior of perforated tube 150 is in fluid communication with purge flow outlet 154 which passes the purge flow from the interior of perforated tube 150 to suitable external valving (not shown) for directing the purge flow to an idle desiccant chamber or the like.

An upper sensor port 156 and a lower sensor port 158 are included for enabling activation of pneumatic or electronic controls or the like. Sensor port 156 accesses purge flow chamber 131, and sensor port 158 accesses purge flow outlet 154. These sensor ports may optionally be plugged if the controls are not to be used.

In operation the second embodiment of the self-adjusting flow metering device operates similarly to the first embodiment, as described above. The greater the static pressure of the fluid in metering tube 118, the larger the area of the passage through the restriction at flow sensing orifice 120 and contoured plug 122. The restriction in metering tube 118 created by flow sensing orifice 120 and contoured plug 122 causes a drop in pressure of fluid flowing through metering tube 118. Since control pressure port 144 connects downstream area 121 of metering tube 118 to upper cavity inlet 147 and upper cavity 145 of diaphragm chamber 116, the pressure above diaphragm 136 is related to the pressure in downstream area 121. Similarly, the pressure in lower cavity 139 below diaphragm 136 is related to the pressure in upstream area 119 of metering tube 118.

As the rate of flow of fluid through metering tube 118 increases, the pressure drop across flow sensing orifice 120 also increases. This causes an imbalance of pressure between upper cavity 145 and lower cavity 139. Diaphragm 136 rises in response to the pressure differential until the pressures on either side of diaphragm 136 are balanced. The rising of diaphragm 136 also raises sleeve 148, which uncovers more holes 152 in perforated tube 150. This increases the amount of purge flow passing through holes 152 to purge flow outlet 154. As shown by the previous equations set forth above, the purge flow increases in volumetric proportion to the increase in the main flow.

Choke orifice 138 may be used to cause a drop in the pressure of the fluid flowing through purge flow tube 134. By adjusting tapered plug 140 within choke orifice 138, the amount of purge flow relative to the amount of main flow may be controlled. The further that tapered plug 140 projects into choke orifice 138, the less purge flow will pass relative to the amount of main flow passing through metering tube 118. Thus, choke orifice 138 adjusts the ratio between the main flow and the purge flow, and enables metering device 110 to be calibrated for different system pressure and flow rates. If a fixed ratio is desired then tapered plug 140 may be eliminated.

Figure 3:
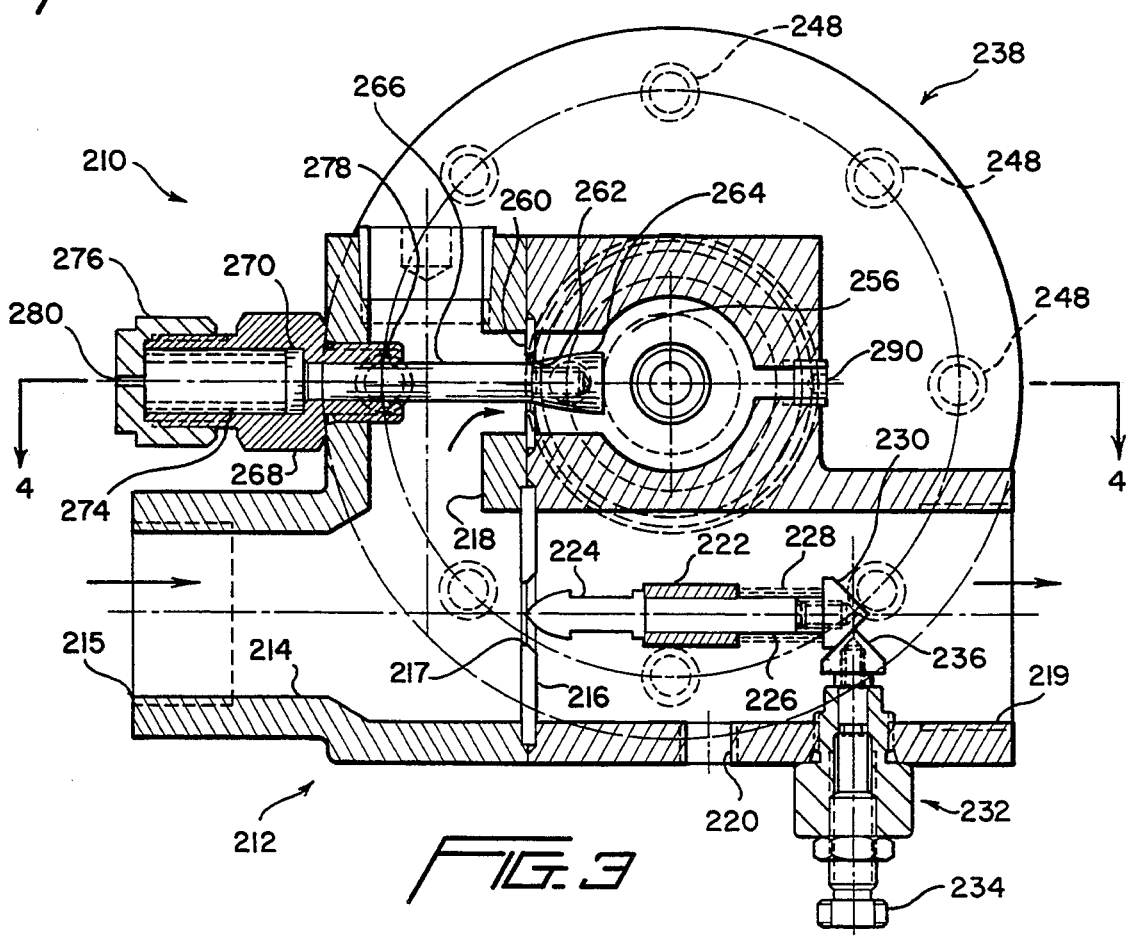
FIG. 3 is a partial cross sectional view in accordance with a third embodiment of the present invention.

FIG. 3 illustrates generally at 210 a third preferred embodiment of a self-adjusting flow metering device in accordance with the present invention. In the third embodiment, the flow sensing orifice and the adjustable choke orifice are switched in location. Self-adjusting flow metering device 210 has a valve body 212 having a main flow tube 214. Main flow tube 214 has an inlet 215 and an outlet 219. Main flow tube 214 has a choke orifice plate 216 located within it, and a choke orifice 217 is located at the center of choke orifice plate 216. A purge flow port 218 is located in main flow tube 214 upstream of choke orifice plate 216 and a control pressure port 220 is located in main flow tube 214 downstream of choke orifice plate 216.

A tubular choke needle support 222 is located downstream of choke orifice plate 216, and is mounted to the inner wall of main flow tube 214 by a suitable mounting means such as a crosshair type support (not shown). The choke needle support 222 is located coaxially with main flow tube 214 such that a choke needle 224 located within choke needle support 222 is centered at the center of choke orifice 217. Choke needle 224 has an elongate needle body 226 which is slidably mounted within choke needle support 222. A compression spring 228 is mounted upon needle body 226, and is held in place by a first conical cap 230.

A choke needle adjustment assembly 232 is mounted within a side wall of main flow tube 214 extending through main flow tube 214. A choke needle adjustment screw 234 extends through choke needle adjustment assembly 232, and a second conical cap 236 is mounted upon the end of adjustment screw 234. Second conical cap 236 is in engagement with first conical cap 230 such that when adjustment screw 234 is turned, moving second conical cap 236 inward, second conical cap pushes against first conical cap 230, compressing compression spring 228, and forcing choke needle 224 into choke orifice 217. Similarly, when adjustment screw 234 is turned in the opposite direction, second conical cap 236 is withdrawn and compression spring 228 will force choke needle 224 out of choke orifice 217.

Figure 4:
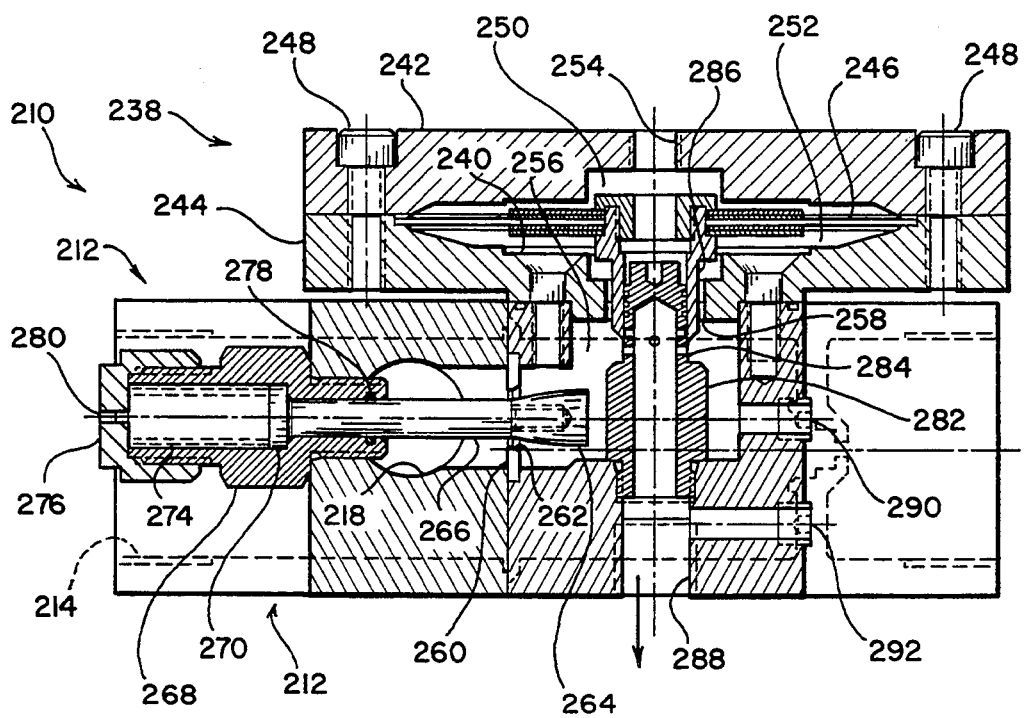
FIG. 4 is a partial cross sectional view of the embodiment of FIG. 3 taken along line 4—4.

As illustrated in FIG. 4, a circular diaphragm housing 238 is mounted on valve body 212 by means of flat head screws 240. Housing 238 is made up of an upper circular plate 242, and a lower circular plate 244. Circular plates 242,244 sandwich between them a diaphragm 246, and are held together by cap screws 248. Housing 238 has an upper cavity 250 above diaphragm 246, and a lower cavity 252 below diaphragm 246. Upper cavity 250 is in fluid communication with a upper cavity inlet 254. Upper cavity inlet 254 may be connected in fluid communication to control pressure port 220 which is in fluid communication with main flow tube 214 as illustrated in FIG. 3. The connection between upper cavity inlet 254 and control pressure port 220 may be made by tubing, braided hose, or other suitable means (not shown).

Referring back to FIG. 4, it may be seen that lower cavity 252 is in fluid communication with a purge flow chamber 256 by means of an opening 258 through valve body 212 and lower circular plate 244. An orifice plate 260 is located between purge flow chamber 256 and purge flow port 218. Orifice plate 260 has a flow sensing orifice 262 allowing fluid communication between purge flow chamber 256 and purge flow port 218. A contoured plug 264 mounted on a stem 266 extends into purge flow chamber 256 concentric with flow sensing orifice 262. Stem 266 is reciprocally mounted in stem support 268 which is mounted through the wall of valve housing 212. Stem 266 has a piston-like stem head 270 which is located in a stem cylinder 272 within stem support 268. Stem cylinder 272 contains a compression spring 274 which bears against stem head 270, and which is held within stem cylinder 272 by a stem cylinder cap 276. Stem cylinder 272 is sealed from the interior of valve housing 212 by a seal 278, and stem cylinder 272 is vented to the ambient atmosphere by a vent 280 located in stem cylinder cap 276. Since stem cylinder 272 is vented to the ambient, when the static pressure within purge flow port 218 becomes large enough to overcome the force of compression spring 274, stem 266 will be forced further into stem cylinder 272, thereby moving contoured plug 264 further into flow sensing orifice 262, decreasing the effective orifice area. This accomplishes the same non-linear effect as increasing the orifice size of the main flow tube did in the first and second embodiments described above.

Located within purge flow chamber 256 is a perforated tube 282. Perforated tube 282 has a plurality of slots or holes 284 which may be holes or slots through its upper portion. A tubular sleeve 286 encircles some of the upper portion of perforated tube 282, and is attached to diaphragm 246. Tubular sleeve 286 is normally positioned to cover a portion of holes 284. However, as diaphragm 246 moves up or down in response to pressure differentials between upper cavity 250 and lower cavity 252, tubular sleeve 286 moves up or down, uncovering or covering additional holes 284, thereby allowing more or less purge gas to flow through holes 284 into perforated tube 282. The interior of perforated tube 282 is in fluid communication with purge flow outlet 288 which may be in fluid communication with appropriate valving (not shown) for feeding the purge gas from the interior of perforated tube 282, out purge flow outlet 288, and to one or the other of the system adsorbent chambers.

An upper sensor port 290 and a lower sensor port 292 are included for enabling activation of pneumatic or electronic controls or the like. Sensor port 290 accesses purge flow chamber 256, and sensor port 292 accesses purge flow outlet 288. These sensor ports may be plugged if the controls are not to be used.

In operation, dry pressurized gas enters main flow tube 214 at inlet 215, and a pressure drop occurs as the gas passes through choke orifice 217. A portion of the main flow is diverted through purge flow port 218, into purge flow chamber 256, into lower cavity 252, through holes 284 into the interior of perforated tube 282, and out of purge flow outlet 288. Since control pressure port 220 is in fluid communication with upper cavity 250, the pressure in upper cavity 250 is related to that in main flow tube 214 after the gas has passed through choke orifice 217. Diaphragm 246 will move up or down to equalize the pressures in upper cavity 250 and lower cavity 252, thereby moving tubular sleeve 286 up or down, exposing more or less holes 284, and allowing more or less purge flow to pass. Flow sensitive orifice 262 is dependent upon the static pressure within purge flow port 218. The greater the static pressure, the further contoured plug 264 moves into flow sensitive orifice 262, creating a greater pressure drop.

In this configuration, in accordance with the above-discussed equations, area A1 is formed by choke orifice 217 and choke needle 224. As in the first embodiment, choke needle 224 may be used to manually adjust the ratio R of the flows. If it is not included, the ratio R will be fixed. In the following equations, area A3 is the area of choke orifice 217 alone. If choke needle 224 is included, the ratio R is the minimum for which metering device 210 is designed.

Area A2 is formed by flow sensing orifice 262 and contoured plug 264. Area A2 varies with the extent of projection of contoured plug 264 into flow sensing orifice 262. Area A2 is the minimum area of the flow path of the gas between flow sensing orifice 262 and contoured plug 264. The minimum area of the flow path through flow sensing orifice 262 alone is represented by A4.

In this configuration:

$$A2 = A3/((P1/P/R) - 1)$$

The extent of the projection of contoured plug 264 into flow sensing orifice 262 can be expressed as follows:

$$L = A5/S*(P1 - P4)$$

Where:
L = the distance contoured plug 264 extends into flow sensing orifice 262
A5 = the area of cylinder 270
S = the spring rate of compression spring 274
P4 = the minimum absolute pressure for which metering device 210 is designed (at P4, L = 0 and $$A2 = A4 - A5)$$

From the preceding equations, the area A4 of flow sensing orifice 262 and the minimum area A2 between flow sensing orifice 262 and contoured plug 264 can be expressed as follows:

$$A4 = A5 + A3/((P4/P2/R) - 1)$$

$$A2 = A3/((L*S/A5R/P2) + (A3/(A4 - A5)))$$

While needle-type choke orifices are shown in the first, second and third preferred embodiments, it is possible to use any type of adjustable orifice valve for the same function. For example, a shutter or flapper type valve may just as easily be used. Or, as mentioned above, if it is acceptable to have a fixed ratio, no adjustment means at all is needed. Furthermore, a shutter, flapper, or other type of valve may also be used to replace the contoured plugs at the flow sensitive orifices of the preferred embodiments, so long as the valve is responsive to changes in the static pressure within the metering device. In addition, while a diaphragm is shown in all three embodiments as the means for controlling the variable orifice at the purge flow outlet, other types of control means responsive to the pressure differential between the upstream and downstream portion may be used to control the purge flow outlet. For example, a piston movable within a cylinder may work just as well as a diaphragm.

While preferred embodiments of a self-adjusting flow metering device in accordance with the present invention have been set forth fully and completely hereinabove, it will be apparent to one of skill in the art that a number of changes could be made without departing from the true spirit and scope of the present invention. Changes in, for example, the shape and configuration of the housing, location of the various components, types of valves used, and the like can be made without departing from the true spirit and scope of the present invention which is accordingly to be limited only by the following claims.

What is claimed is:
1. A self-adjusting flow metering device comprising:
a tube for passing a first flow stream therethrough, said tube having an upstream portion and a downstream portion, and said tube having an orifice disposed therein between said upstream portion and said downstream portion;
a diaphragm chamber having a diaphragm disposed therein, said diaphragm having a first side and a second side, said diaphragm being movable within said diaphragm chamber;
a first port within said upstream portion of said tube for receiving a portion of said first flow stream as a second flow stream, said first port being in fluid communication with said first side of said diaphragm;

a second port within said downstream portion of said tube, said second port being in fluid communication with said second side of said diaphragm;

a first variable orifice responsive to a differential between a first pressure within said second flow stream and a second pressure outside of said second flow stream; and a second variable orifice means controlled by said diaphragm and in fluid communication with said second flow stream downstream of said first variable orifice whereby, as said diaphragm responds to changes in pressure between said first side of said diaphragm and said second side of said diaphragm, said second variable orifice increases or decreases in area allowing said second flow stream to pass therethrough.

2. The self-adjusting flow metering device of claim 1 wherein said orifice within said tube is an adjustable orifice for controlling the ratio of said first flow stream to said second flow stream.

3. The self-adjusting flow metering device of claim 2 wherein said adjustable orifice is a tapered plug manually movable within an orifice.

4. The self-adjusting flow metering device of claim 1 wherein said first variable orifice includes an orifice and a contoured plug reciprocally mounted within a cylinder, said cylinder having an interior volume vented to a location outside of said self-adjusting flow metering device.

5. The self-adjusting flow metering device of claim 4 further including a spring within said cylinder for biasing said contoured plug away from said orifice.

6. The self-adjusting flow metering device of claim 1 wherein said second variable orifice includes a perforated tube having a plurality of perforations therein whereby the interior of said perforated tube is in fluid communication with the exterior of said perforated tube through said perforations; and a tubular sleeve having a first end connected to said diaphragm and a second end reciprocally mounted over said perforated tube.

7. A flow metering device for regulating a volume of a main flow of a compressed gas in proportion to a volume of a secondary flow a of compressed gas, said flow metering device comprising:

a main flow section for receiving a main flow of a gas, said main flow section having a main upstream area and a main downstream area;

a main flow orifice located in said main flow section between said main upstream area and said main downstream area;

a port in said main upstream area in fluid communication with a secondary flow section for receiving a portion of a main flow of a gas as a secondary flow, said secondary flow section having a secondary upstream area and a secondary downstream area;

a secondary flow orifice located in said secondary flow section between said secondary upstream area and said secondary downstream area;

a pressure sensing means in communication with said secondary downstream area and also in communication with said main downstream area, said pressure sensing means being useable to sense a difference in pressure between said secondary downstream area and said main downstream area;

a secondary flow regulating means in fluid communication with said secondary flow section, said secondary flow regulating means being operative in response to said pressure sensing means to regulate an amount of a secondary flow in response to said difference in pressure sensed by said pressure sensing means; and an orifice varying means associated with one of said main flow orifice and said secondary flow orifice for changing an orifice ratio between said main flow orifice and said secondary flow orifice in response to a change in a pressure across one of said main flow orifice and said secondary flow orifice, whereby a volume of a secondary flow of a gas is permitted to pass through said secondary flow regulating means in approximately constant proportion to a volume of a main flow of a gas passing through said main flow section.

8. The flow metering device of claim 7 wherein said pressure sensing means includes a diaphragm chamber having a flexible diaphragm movable in response to a pressure differential between said secondary downstream area and said main downstream area.

9. The flow metering device of claim 8 wherein said secondary flow regulating means includes:

a perforated tube located in said secondary downstream area, said perforated tube having an outlet and a plurality of perforations, said perforations enabling fluid communication between said secondary downstream area and said outlet; and a tubular sleeve obliquely connected to said flexible diaphragm, said tubular sleeve being mounted about said perforated tube and movable upon said perforated tube such than as said flexible diaphragm moves in response to a pressure differential between said secondary downstream area and said main downstream area, said tubular sleeve exposes more or less of said perforations upon said perforated tube, permitting more or less of said secondary flow to pass from said secondary downstream area to said outlet.

10. The flow metering device of claim 7 wherein said orifice varying means includes a spring-loaded contoured plug which is extendable into one of said secondary flow orifice and said main flow orifice, said contoured plug being responsive to changes in first pressure within said metering device and a second pressure external to said metering device.

* * * * *